(12) United States Patent
Hsieh (10) Patent No.: US 10,098,454 B2
(45) Date of Patent: Oct. 16, 2018

(54) MODULAR BOTTLE RACK

(71) Applicant: Chih-Chien Hsieh, Taichung (TW)

(72) Inventor: Chih-Chien Hsieh, Taichung (TW)

(*) Notice: Subject to any disclaimer, the term of this patent is extended or adjusted under 35 U.S.C. 154(b) by 0 days.

(21) Appl. No.: 15/868,453

(22) Filed: Jan. 11, 2018

(65) Prior Publication Data

US 2018/0132613 A1 May 17, 2018

Related U.S. Application Data

(63) Continuation-in-part of application No. 15/190,465, filed on Jun. 23, 2016.

(51) Int. Cl.
| | | |
|---|---|---|
| *A47G 7/04* | (2006.01) | |
| *A47B 73/00* | (2006.01) | |
| *A47B 57/18* | (2006.01) | |
| *A47B 47/00* | (2006.01) | |
| *A47F 7/28* | (2006.01) | |
| *A47J 47/00* | (2006.01) | |
| *A47B 96/02* | (2006.01) | |

(52) U.S. Cl.
CPC ........ *A47B 73/006* (2013.01); *A47B 47/0091* (2013.01); *A47B 57/18* (2013.01); *A47B 96/027* (2013.01); *A47F 7/283* (2013.01); *A47G 7/044* (2013.01); *A47J 47/00* (2013.01)

(58) Field of Classification Search
CPC ....... A47F 7/283; A47B 73/006; A47B 73/00; A47B 47/0091; A47B 81/007; A47B 81/00; A47G 7/044; A47G 7/04
See application file for complete search history.

(56) References Cited

U.S. PATENT DOCUMENTS

| | | | | |
|---|---|---|---|---|
| 899,384 | A * | 9/1908 | Lugowski | A47F 7/283 |
| | | | | 211/75 |
| 1,425,550 | A * | 8/1922 | Spiro | A47B 81/007 |
| | | | | 24/339 |
| 1,818,059 | A * | 8/1931 | Gavlak | A47G 29/14 |
| | | | | 248/312.1 |
| 4,050,584 | A * | 9/1977 | Lino | A47B 73/00 |
| | | | | 206/591 |
| 4,997,157 | A * | 3/1991 | Sweeny | A62C 13/78 |
| | | | | 248/310 |
| 5,071,100 | A * | 12/1991 | Sweeny | A62C 13/78 |
| | | | | 248/310 |
| D331,174 | S * | 11/1992 | Polski | D7/621 |
| 6,290,063 | B1 * | 9/2001 | Vogt | B60N 3/103 |
| | | | | 206/549 |

(Continued)

*Primary Examiner* — Kimberley S Wright
(74) *Attorney, Agent, or Firm* — Egbert Law Offices, PLLC (57) ABSTRACT

A modular bottle rack includes at least two modular units laterally mounted to each other. Each modular unit includes a main frame and a basket mounted onto the main frame, wherein the bracket is selectively reciprocally moved relative to the main frame due to a height of the bottle supported on the main frame. Two fasteners are screwed onto the bracket for selectively positioning the bracket on the main frame. The main frame includes is divided into an assembling portion and a supporting portion, wherein a first connecting structure and a second connecting structure are respectively disposed on two opposite sides of the assembling portion, and the first connecting structure is assembled to a second connecting structure of an adjacent modular unit.

7 Claims, 10 Drawing Sheets

(56) References Cited

U.S. PATENT DOCUMENTS

| | | | |
|---|---|---|---|
| 6,766,912 B1* | 7/2004 | Gibbs | A47G 23/0225 |
| | | | 211/74 |
| 7,271,336 B2* | 9/2007 | Dinh | H02G 3/125 |
| | | | 174/50 |
| 2007/0084617 A1* | 4/2007 | Dinh | H02G 3/125 |
| | | | 174/58 |
| 2007/0295866 A1* | 12/2007 | Yang | E03C 1/06 |
| | | | 248/70 |

* cited by examiner

MODULAR BOTTLE RACK

CROSS-REFERENCE TO RELATED U.S. APPLICATIONS

This application is a Continuation-In-Part of Ser. No. 15/190,465, filed 23 Jun. 2016, and entitled "BOTTLE RACK", presently pending.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a bottle rack, and more particularly to a modular bottle rack that is laterally assembled by multiple modular units.

2. Description of Related Art Including Information Disclosed Under 37 CFR 1.97 and 37 CFR 1.98

In our daily lives, especially in the kitchen, many bottles are used for containing seasoning or sauces. These bottles may be dumped due to an improper touch during cooking processes when the bottles are not arranged in order such that the cooking environment is polluted and need to be cleaned. Another place we may use various bottles for containing solutions, such as spray cleaning solution, is the garage.

Whether the kitchen or the garage, the bottles have a common feature that is a round cross-section. In other words, the bottles may roll everywhere. At best, the bottle(s) cannot be easily found; at worst, a person may fall when stepping on a bottle. In view of this, an elongated bottle rack is marketed. The conventional bottle rack has a groove for partially receiving the bottles. However, the depth of the groove in the conventional bottle rack is fixable. As a result, the bottle cannot be easily found when the bottle is short and the bottle may lose balance when the bottle is tall.

The present invention has arisen to mitigate and/or obviate the disadvantages of the conventional bottle rack.

BRIEF SUMMARY OF THE INVENTION

The main objective of the present invention is to provide an improved modular bottle rack that is laterally assembled by multiple modular units and adjusted due to a height of the bottle(s) arranged thereon.

To achieve the objective, the modular bottle rack in accordance with the present invention comprises at least two modular units laterally mounted to each other. Each modular unit comprises a main frame, a basket mounted onto the main frame and two fasteners screwed onto the bracket for selectively positioning the bracket on the main frame. The main frame includes an L-shaped cross-section divided into an assembling portion and a supporting portion, wherein the assembling portion has two parallel elongated recesses longitudinally defined in a back thereof. An elongated groove is defined in a bottom of each of the two elongated recesses. The assembling portion has two elongated raised portions formed on a front thereof and each elongated raised portions extending along a midline of a corresponding one of the two elongated groove. The assembling portion includes a first side and a second side parallel to each other, wherein a first connecting structure and a second connecting structure are respectively disposed on the first side and the second side of the assembling portion, and the first connecting structure is assembled to a second connecting structure of an adjacent modular unit. The bracket is selectively reciprocally moved relative to the main frame due to a height of the bottle supported on the main frame. The bracket includes a mounting portion selectively slidably mounted onto the assembling portion and abutting against the two elongated raised portion. The mounting portion includes a first holder and a second holder respectively extending from an upper edge and a lower edge of the mounting portion. The first holder has a first through hole defined therein and the second holder has a second through hole defined therein, wherein the first through hole and the second through hole co-axially correspond to each other for allowing the bottle extending through the first holder and the second holder. Two through holes are defined in the mounting portion and each through hole communicates with a corresponding one of the two elongated groove.

Each fastener includes a bolt and a nut. The bolt includes a head and a threaded stub extending from the head, wherein the head is received in a corresponding one of the two elongated recesses and selectively securely abutting a bottom of the corresponding elongated recess. Each elongated recess has a depth greater than a thickness of the head. The nut is screwed onto the threaded stub after the threaded stub sequentially extending through the corresponding elongated groove and the corresponding through hole for fastening the bracket. The mounting portion of the bracket is securely clamped between the two nuts and the heads of the two bolts, and abutting the two elongated raised portions such that the bracket is fastened on the assembling portion of the main frame.

Further benefits and advantages of the present invention will become apparent after a careful reading of the detailed description with appropriate reference to the accompanying drawings.

DETAILED DESCRIPTION OF THE INVENTION

Figure 1:
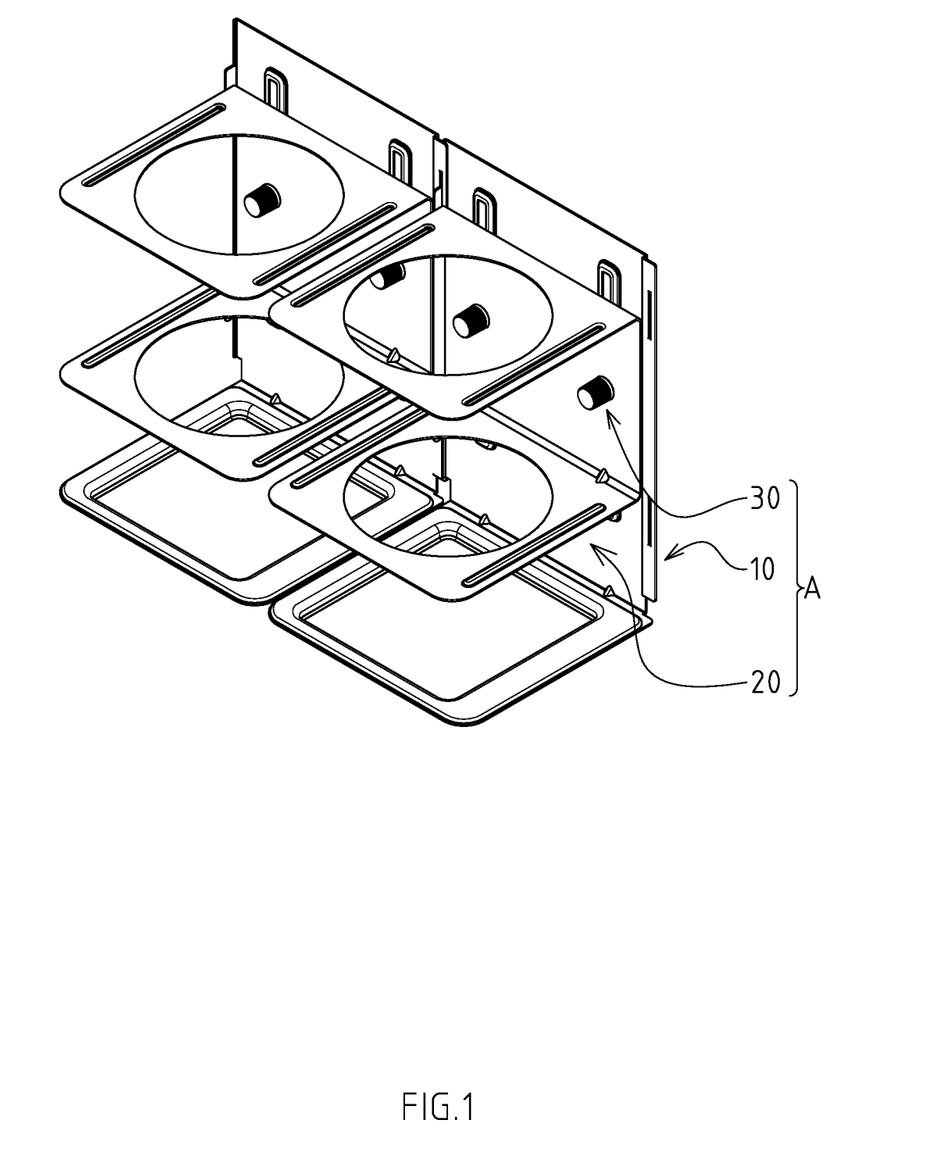
FIG. 1 is a perspective schematic view of a modular bottle rack in accordance with the present invention.
Figure 2:
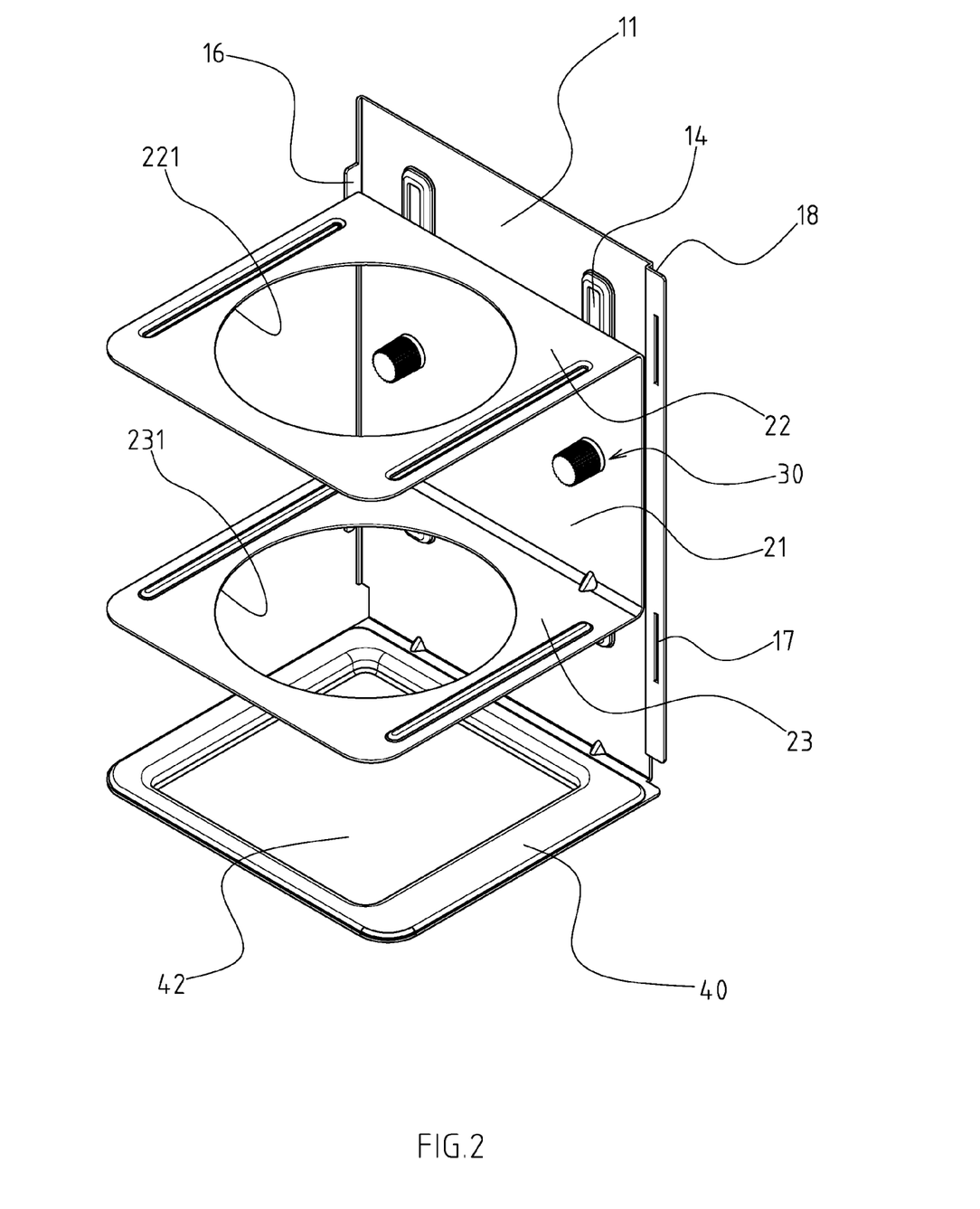
FIG. 2 is a perspective view of a modular unit of the modular bottle rack in accordance with the present invention.
Figure 11:
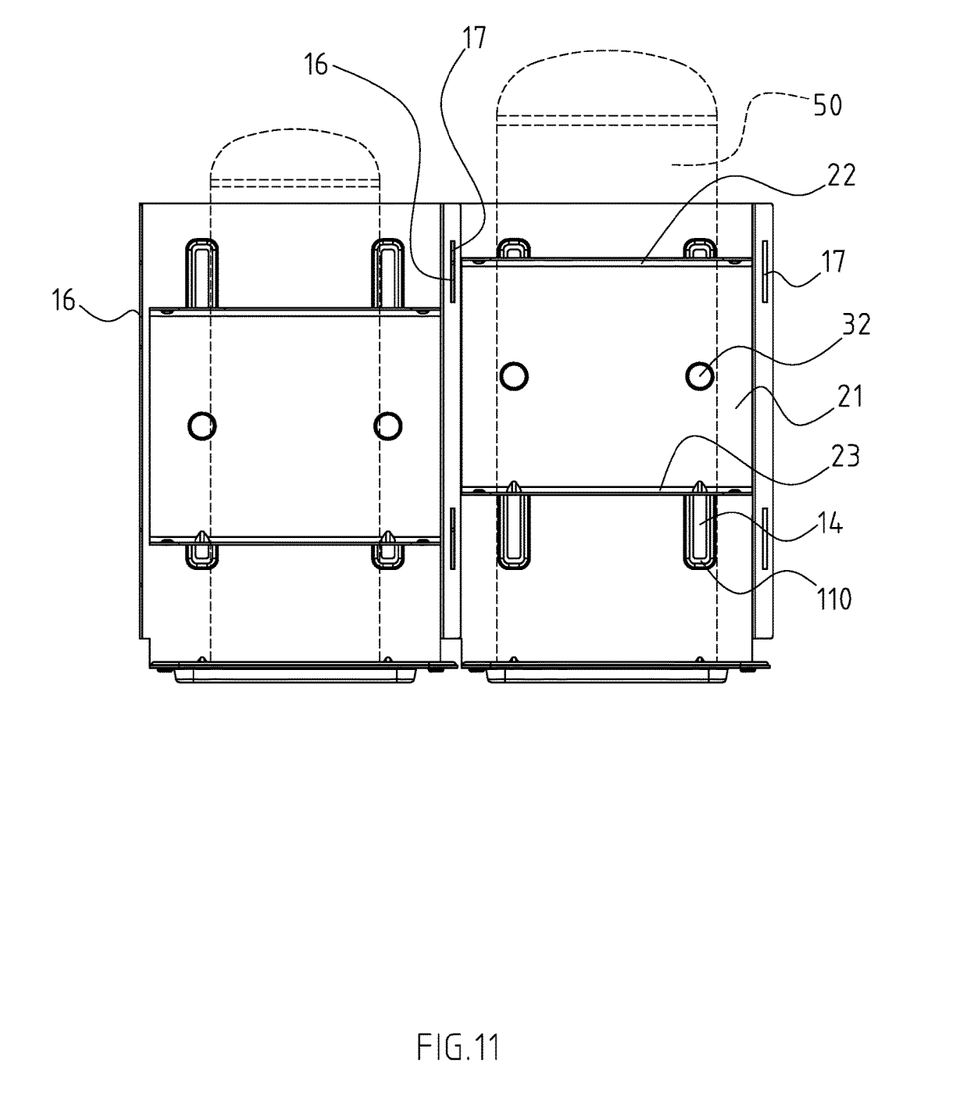
FIG. 11 is an operational view of the modular bottle rack in accordance with the present invention.
Figure 12:
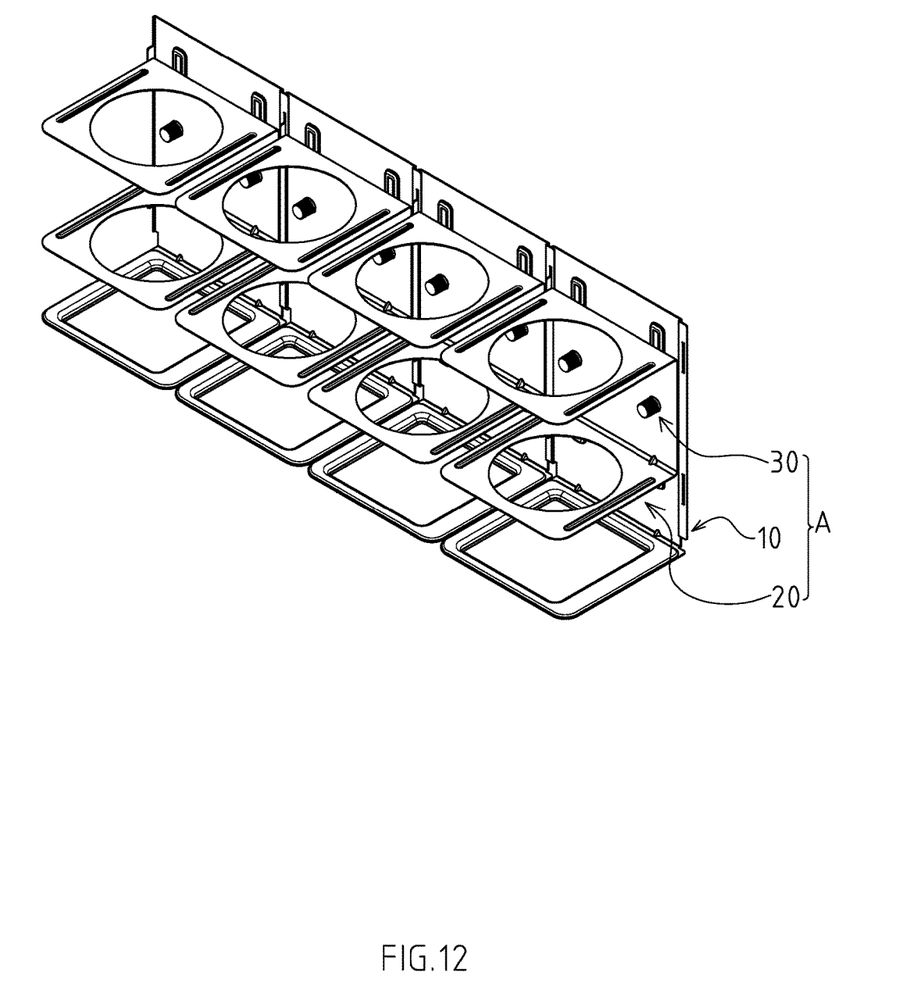
FIG. 12 is a second perspective schematic view of the modular bottle rack in accordance with the present invention.

Referring to the drawings and initially to FIGS. 1 and 2, a modular bottle rack in accordance with the present invention comprises at least two modular units A laterally mounted to each other. Each modular unit A includes a main frame 10 and a basket 20 mounted onto the main frame 10, wherein the bracket 20 is selectively reciprocally moved relative to the main frame 10 due to a height of the bottle 50 supported on the main frame 10, as shown in FIG. 11. With referenced to FIG. 12, there are for modular units A sequentially and laterally mounted to one another.

Figure 3:
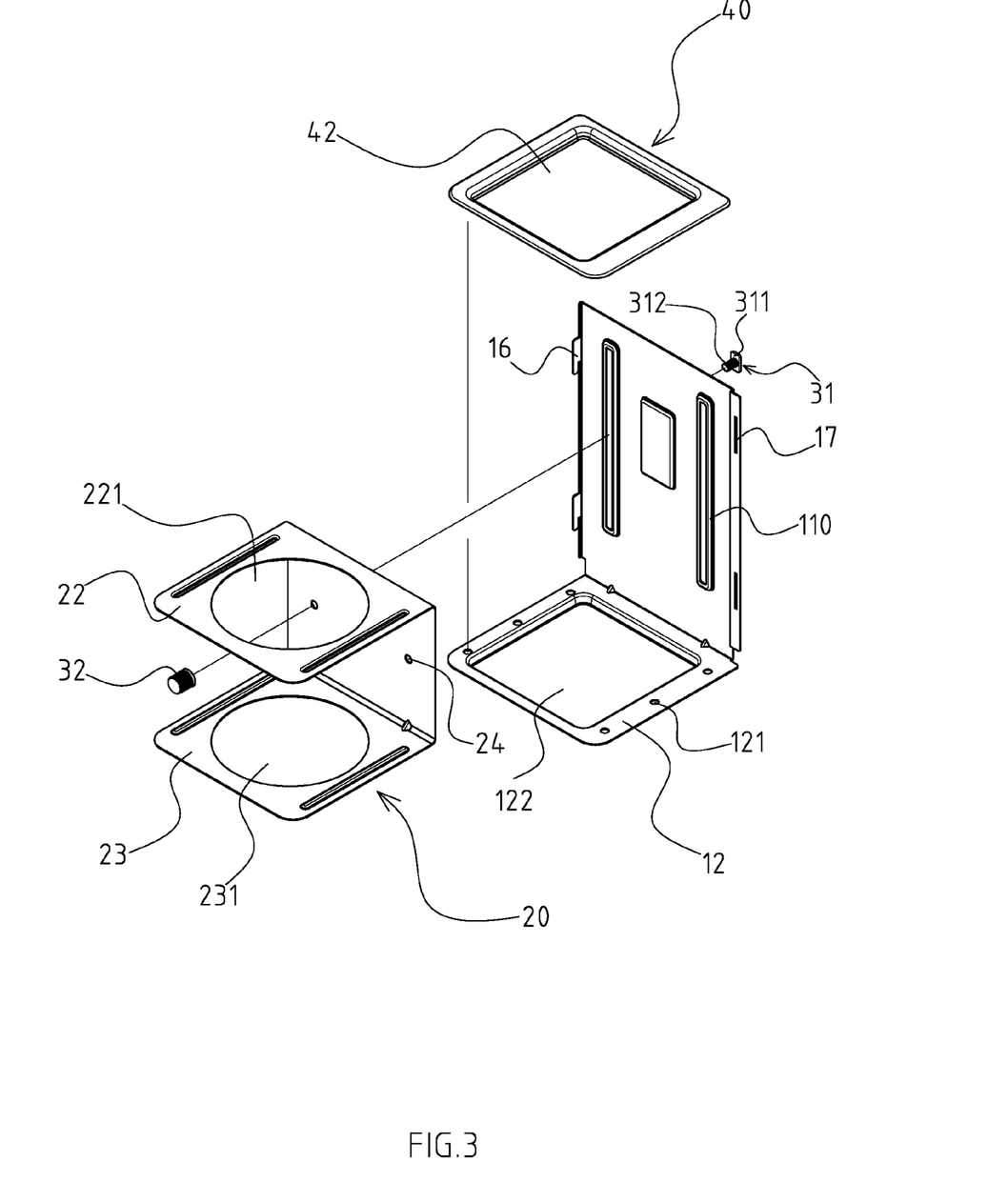
FIG. 3 is an exploded perspective view of the modular unit in FIG. 2.
Figure 4:
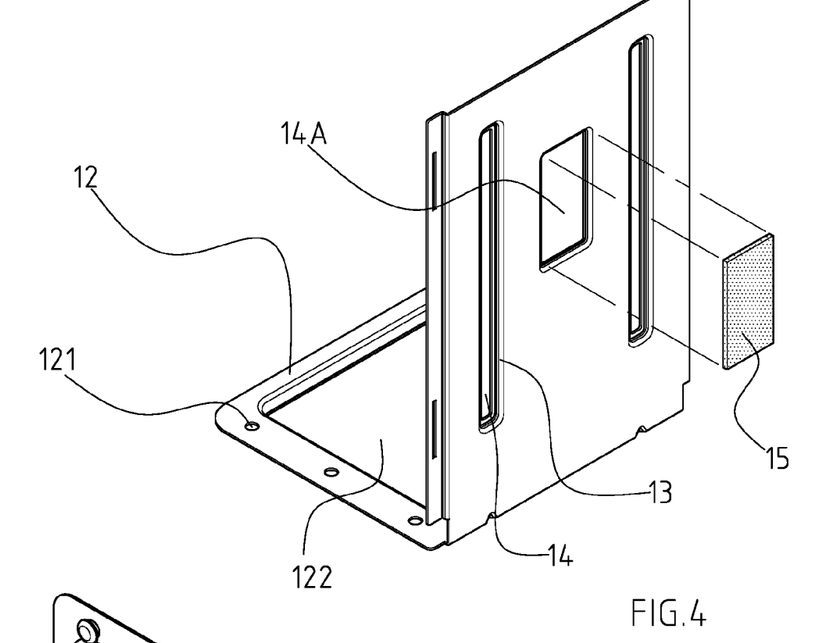
FIG. 4 is an exploded perspective view of a main frame of the modular unit in FIG. 2.
Figure 5:
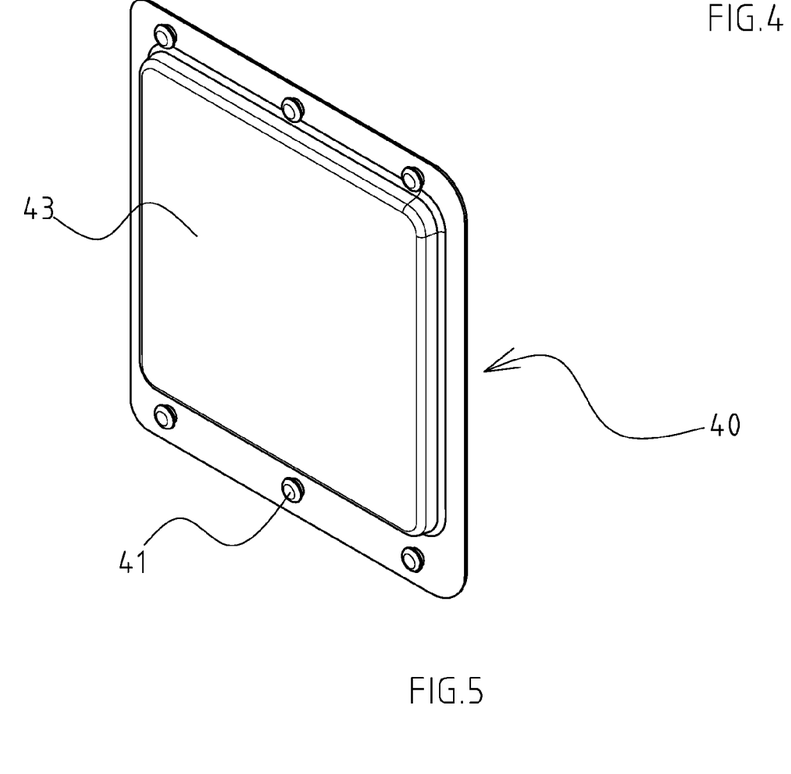
FIG. 5 is a perspective view of a tray of the modular unit of the modular bottle rack in accordance with the present invention.
Figure 6:
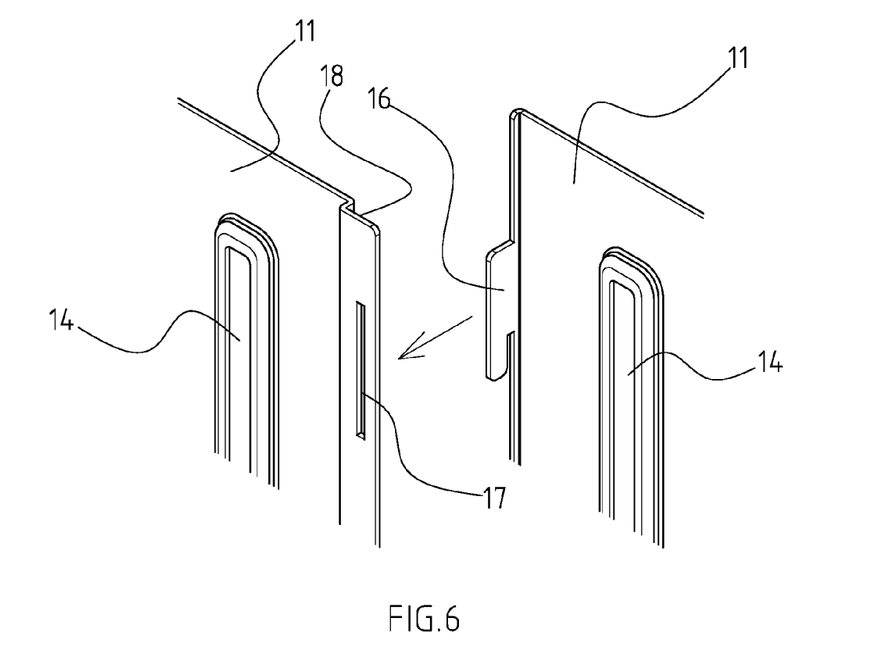
FIG. 6 is an operational view illustrating how to assemble two main frames.
Figure 7:
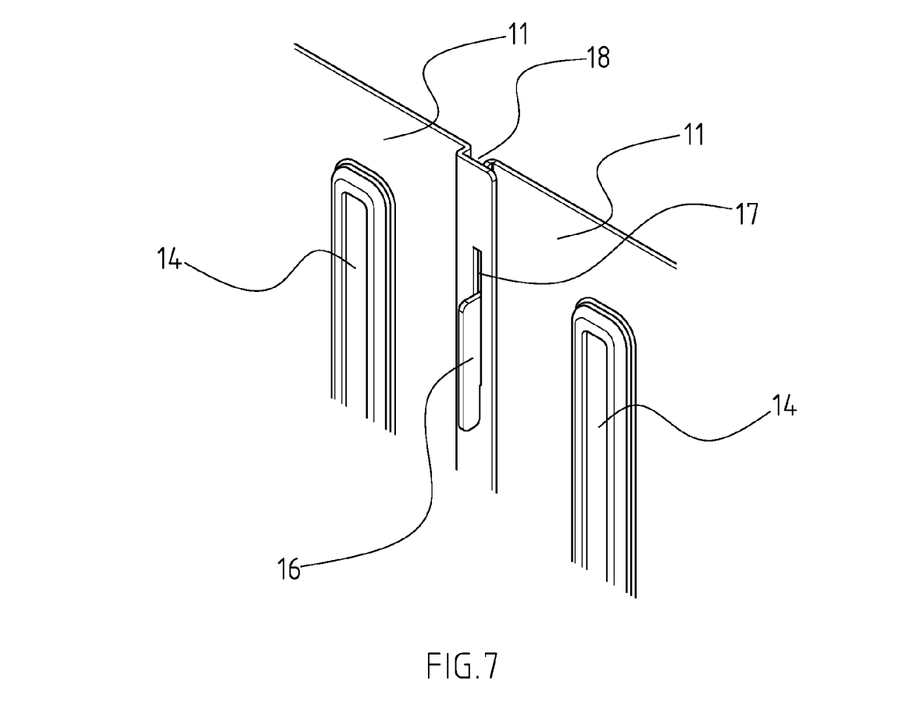
FIG. 7 is a partially perspective view of two assembled main frames.

Further with reference to FIGS. 3 and 4, the main frame 10 has an L-shaped cross-section divided into an assembling portion 11 and a supporting portion 12, wherein the assembling portion 11 has two parallel elongated recesses 13 longitudinally defined in a back thereof. An elongated groove 14 is defined in a bottom of each of the two elongated recesses 13. The assembling portion 11 has two elongated raised portions 110 formed on a front thereof and each elongated raised portions 110 extends along a midline of a corresponding one of the two elongated groove 14. The assembling portion 11 has a recess 14A defined in the back thereof and a magnet 15 is secured in the recess 14A such that the modular bottle rack in accordance with the present invention is capable of temporarily securing on an iron cabinet. In addition, the modular bottle rack in accordance with the present invention also can be mounted onto a wall or directly put on a tabletop. The assembling portion 11 includes a first side and a second side parallel to each other, wherein a first connecting structure 16 and a second connecting structure 17 are respectively disposed on the first side and the second side of the assembling portion 11, and the first connecting structure 16 is assembled to a second connecting structure 17 of an adjacent modular unit A. In the preferred embodiment of the present invention, the first connecting structure 16 includes multiple hooks forwardly extending from the assembling portion 11 and longitudinally arranged on the first side of the assembling portion 11, and the second connecting structure 17 includes multiple slots defined in the assembling portion 11 and longitudinally arranged on the second side of the assembling portion 11. With reference to FIGS. 6 and 7, when assembling the two adjacent modular units A, each hook extends through a corresponding one of the multiple slots in the adjacent modular unit A and engaged to a lower edge of the corresponding slot. For aligning the assembling portions 11 of the assembled modular unit A. The assembling portion 11 includes a groove 18 defined in a back of the second side thereof for receiving the first side of the assembling portion 11 of the adjacent modular unit A, wherein the multiple slots, in the second side of the assembling portion 11, are defined in a bottom of the groove 18.

Figure 8:
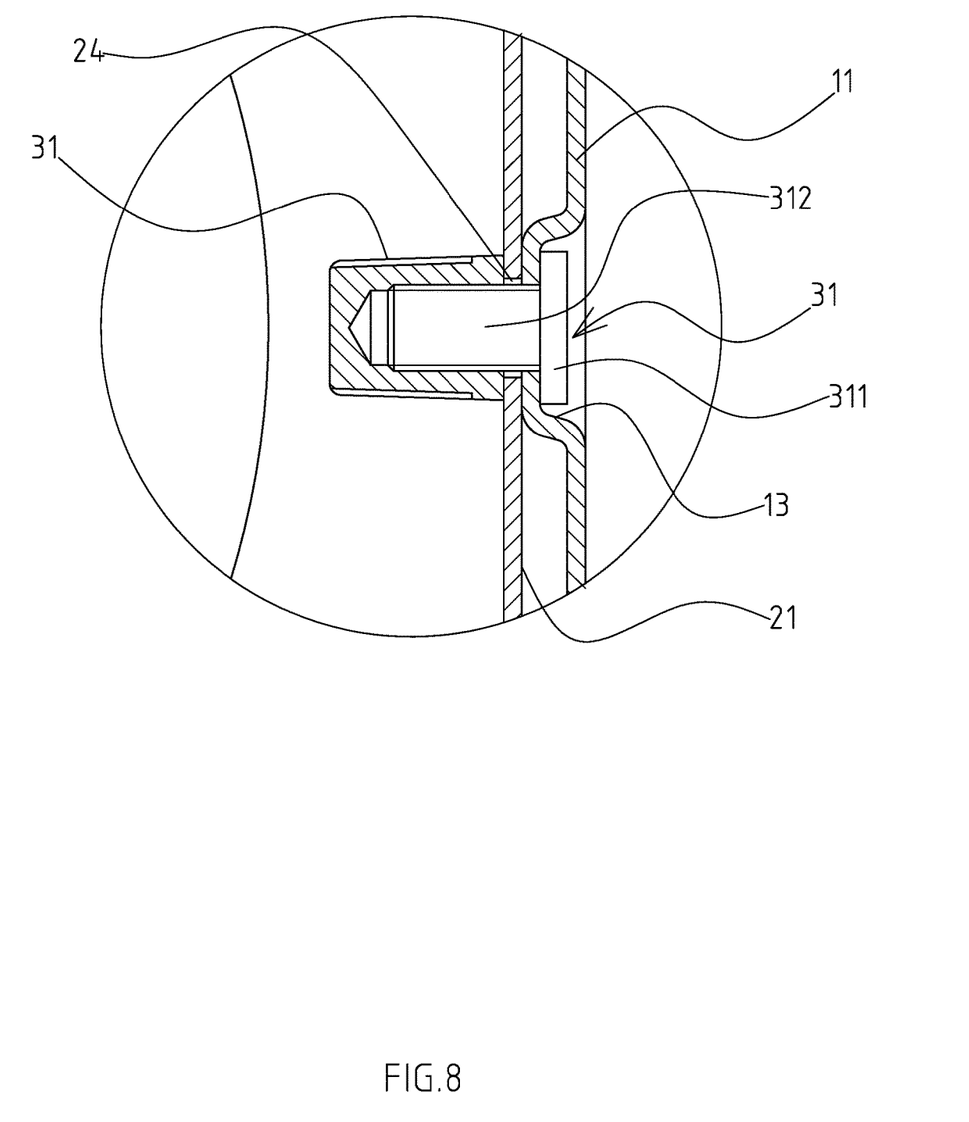
FIG. 8 is a partially cross-sectional view of the modular unit is FIG. 2.

With reference to FIGS. 2, 3 and 8, the bracket 20 includes a mounting portion 21 selectively slidably mounted onto the assembling portion 11 and abuts against the two elongated raised portion 110. The mounting portion 21 includes a first holder 22 and a second holder 23 respectively extending from an upper edge and a lower edge of the mounting portion 21. The first holder 22 has a first through hole 221 defined therein and the second holder 23 has a second through hole 231 defined therein, wherein the first through hole 221 and the second through hole 231 co-axially correspond to each other for allowing the bottle 50 extending through the first holder 22 and the second holder 23. Two through holes 24 are defined in the mounting portion 21 and each through hole 24 communicates with a corresponding one of the two elongated groove 14. Two fasteners 30 are screwed onto the bracket 20 for selectively positioning the bracket 20 on the main frame 10. Each fastener 30 includes a bolt 31 and a nut 32. The bolt 31 includes a head 311 and a threaded stub 312 extending from the head 311, wherein the head 311 is received in a corresponding one of the two elongated recesses 13 and selectively securely abutting a bottom of the corresponding elongated recess 14. Each elongated recess 13 has a depth greater than a thickness of the head 311. The nut 32 is screwed onto the threaded stub 312 after the threaded stub 312 sequentially extending through the corresponding elongated groove 14 and the corresponding through hole 24 for fastening the bracket 20. In the preferred embodiment, the nut 32 has a cylinder structure such that the operator can easily and directly rotate the nut 32 with his/her fingers for providing an effect of quick-release.

With reference to FIG. 11, the mounting portion 21 of the bracket 20 is securely clamped between the two nuts 32 and the heads 311 of the two bolts 31, and abuts the two elongated raised portions 110 such that the bracket 20 is fastened on the assembling portion 11 of the main frame 10. When arranging the bottles 50, the bottles 50 stand on the supporting portions 12 of the main frames 10 after sequentially extending through the first through hole 221 and the second through hole 231 in the brackets 20. When adjusting the position of the brackets 20 relative to the assembling portion 11 of the main frame 10 due to the height of the bottle 50 thereon, the bracket 20 is freely moved on the assembling portion 11 when the nuts 32 are released and the bracket 20 is fastened against after adjusting the height of the bracket 20 relative to the height of the bottle 50 for effectively holding the bottle 50 in place. As described above, the mounting portion 21 of the bracket 20 abuts the two elongated raised portions 110 such that the contact area between the mounting portion 21 and the assembling portion 11 is reduced for providing a smooth operation when the bracket 20 is moved relative to the main frame 10. In addition, the modular units A in accordance with the present invention can be sequentially laterally mounted to one another/each other due to the quantity of the bottles 50 for conveniently arranging bottles 50.

With reference to FIGS. 1-3 and 5, the main frame 10 further includes a tray 40 detachably mounted onto the supporting portion 12 thereof. The supporting portion 12 includes two opposite sides each having multiple bores 121 defined therein and extending therethrough. The tray 40 includes multiple snapper 41 formed on a bottom face and each snapper 41 is selectively snapped into a corresponding one of the multiple bores 121 for positioning the tray 40 on the supporting portion 12. The tray 40 includes a concave portion 42 defined in a top side thereof. When the modular unit A holding the bottle 50 in place, a lower end of the bottle 50 is received in the concave portion 42. In the kitchen, the modular bottle rack in accordance with the present invention is usually provided for holding bottles 50 that contains thick sauce. The residual thick sauce may pour down the outer periphery of the bottle 50. The concave portion 41 of the tray 40 is provided to contain the pouring thick sauce. The dirty tray 40, due to the pouring thick sauce, is detached from the supporting portion 12 for cleaning and reused. Further with reference to FIGS. 3, 4 and 5, the top face of the supporting portion 12 and the bottom face of the tray 40 are complementally coupled to each other. The supporting portion 12 has a concave portion 122 defined in the top face thereof and the tray 40 has a convex portion 43 formed on the bottom face thereof, wherein the convex portion 43 is received in the concave portion 122 in the supporting portion 12 when the tray 40 is mounted onto the supporting portion 12.

Figure 9:
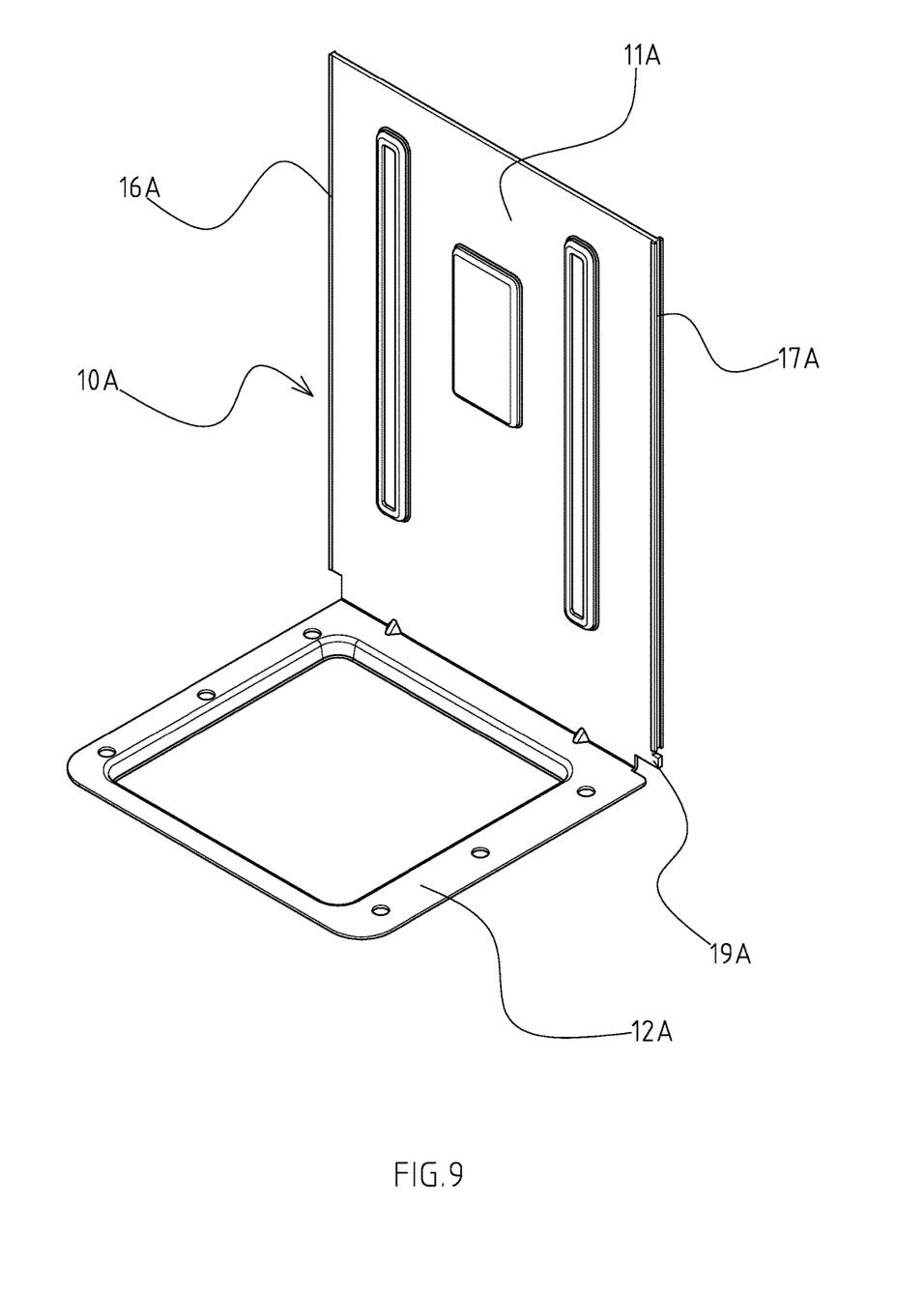
FIG. 9 is a perspective view of a second preferred embodiment of the main frame in accordance with the present invention.
Figure 10:
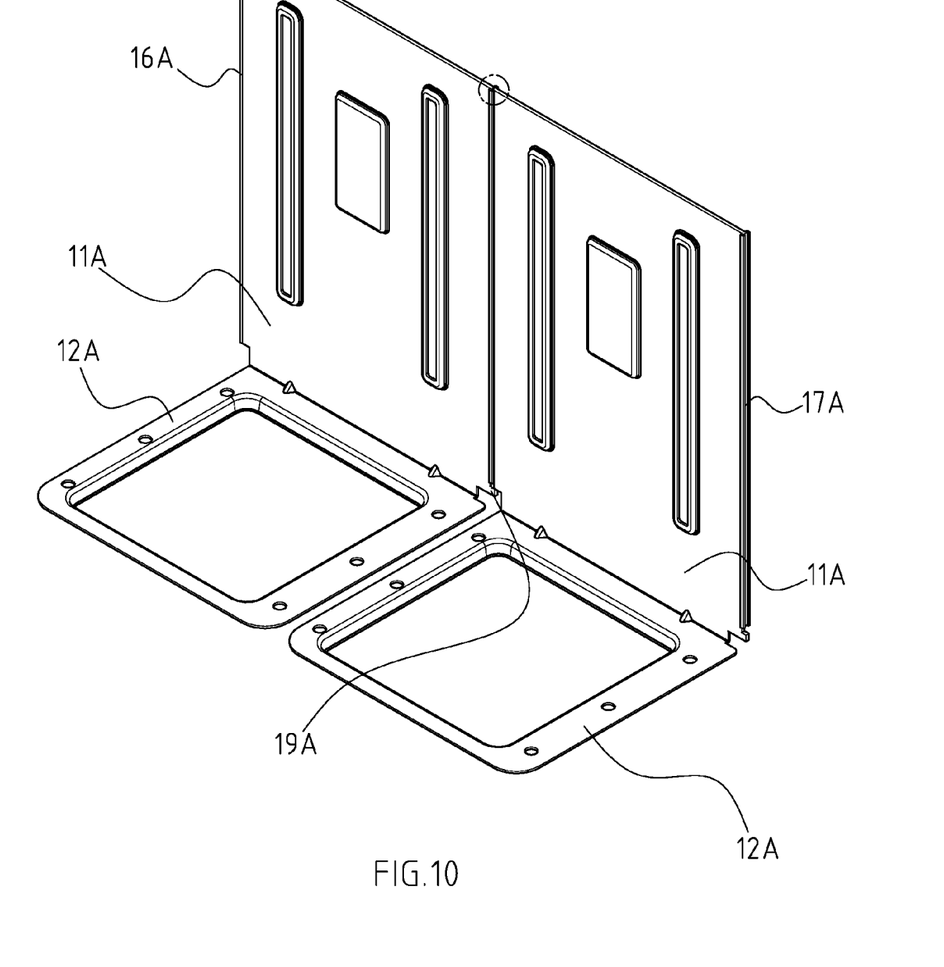
FIG. 10 is a perspective view of two assembled main frames in FIG. 9.
Figure 10A:
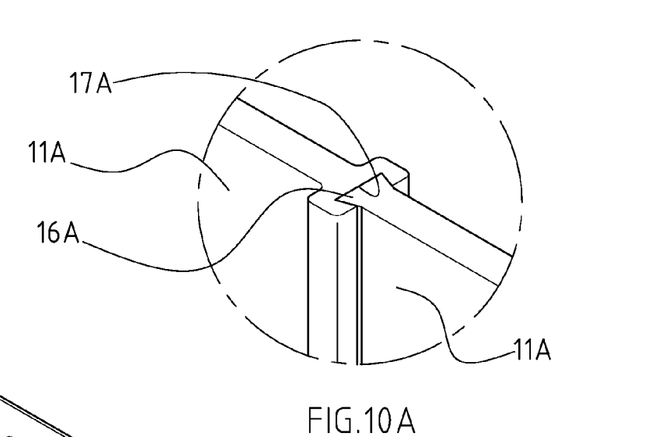
FIG. 10A is a partially enlarged view of FIG. 10.

With reference to FIGS. 9, 10 and 10A that show a second embodiment of the main frame 10A in accordance with the present invention, in this embodiment, the first connecting structure 16A is a dove-tail rail and the second connecting structure 17A is a dove-tail groove, wherein the assembling portion 11A has a stopper 19A laterally extending therefrom under a lower end of second connecting structure 17A. When assembling the two adjacent modular unit A, the dove-tail rail is complementally mounted into the dove-tail groove in the assembling portion 11A of the adjacent main frame 10A and a lower end of the dove-tail rail abuts the stopper the assembling portion 11A of the adjacent main frame 10A, wherein the two adjacent supporting portion 12A laterally aligns with each other due to a height of the stopper 19A. In the preferred embodiment of the present invention, the main frame 10A is manufactured by injection molding.

Although the invention has been explained in relation to its preferred embodiment, it is to be understood that many other possible modifications and variations can be made without departing from the spirit and scope of the invention as hereinafter claimed.

I claim:

1. A modular bottle rack assembly comprising:
    at least two modular units laterally mounted to each other, wherein each of the two modular units comprises:
        a main frame having an L-shaped cross-section divided into an assembling portion and a supporting portion, wherein the assembling portion has two parallel elongated recesses longitudinally defined in a back thereof and an elongated groove defined in a bottom of each of the two parallel elongated recesses, the assembling portion having two elongated raised portions formed on a front thereof and wherein each of the two elongated raised portions extends along a midline of a corresponding one of the elongated grooves, the assembling portion having a first side and a second side parallel to each other, wherein a first connecting structure and a second connecting structure are respectively disposed on the first side and the second side of the assembling portion, wherein the first connecting structure is assembled to a second connecting structure of an adjacent modular unit of the at least two modular units;
        a bracket mounted onto the main frame, wherein the bracket is selectively reciprocally movable relative to the main frame relative to a height of a bottle supported on the main frame, the bracket having a mounting portion selectively slidably mounted onto the assembling portion and abutting against the two elongated raised portions, the mounting portion having a first holder and a second holder respectively extending from an upper edge and a lower edge of the mounting portion, the first holder having a first through hole defined therein and the second holder having a second through hole defined therein, wherein the first through hole and the second through hole co-axially correspond to each other so as to allow the bottle to extend through the first holder and the second holder, wherein a pair of through holes are defined in the mounting portion and each of the pair of through holes communicates with a corresponding one of the elongated grooves; and
        a pair of fasteners screwed onto the bracket to selectively position the bracket on the main frame, each of the pair of fasteners has a bolt and a nut, the bolt having a head and a threaded stub extending from the head, wherein the head is received in a corresponding one of the two parallel elongated recesses and selectively securely abutting a bottom of the corresponding parallel elongated recess, each of the parallel elongated recesses having a depth greater than a thickness of the head, the nut being screwed onto the threaded stub after the threaded stub sequentially extends through the corresponding elongated groove and the corresponding through hole so as to fasten the bracket, wherein the mounting portion of the bracket is securely clamped between the nuts and the heads of the bolts and abutting the two elongated raised portions such that the bracket is fastened on the assembling portion of the main frame, wherein the first connecting structure has multiple hooks forwardly extending from the assembling portion and longitudinally arranged on the first side of the assembling portion, wherein the second connecting structure has multiple slots defined in the assembling portion and longitudinally arranged on the second side of the assembling portion, wherein each hook extends through a corresponding one of multiple slots in the adjacent modular unit and engaged to a lower edge of the corresponding slot when the at least two modular units are assembled together, wherein the assembling portion has a groove defined in a back of the second side thereof that receives the first side of the assembling portion of the adjacent modular unit, and wherein the multiple slots are defined in a bottom of the elongated groove in the second side of the assembling portion.

2. A modular bottle rack assembly comprising:
    at least two modular units laterally mounted to each other, wherein each of the two modular units comprises:
        a main frame having an L-shaped cross-section divided into an assembling portion and a supporting portion, wherein the assembling portion has two parallel elongated recesses longitudinally defined in a back thereof and an elongated groove defined in a bottom of each of the two parallel elongated recesses, the assembling portion having two elongated raised portions formed on a front thereof and wherein each of the two elongated raised portions extends along a midline of a corresponding one of the elongated grooves, the assembling portion having a first side and a second side parallel to each other, wherein a first connecting structure and a second connecting structure are respectively disposed on the first side and the second side of the assembling portion, wherein the first connecting structure is assembled to a second connecting structure of an adjacent modular unit of the at least two modular units;

a bracket mounted onto the main frame, wherein the bracket is selectively reciprocally movable relative to the main frame relative to a height of a bottle supported on the main frame, the bracket having a mounting portion selectively slidably mounted onto the assembling portion and abutting against the two elongated raised portions, the mounting portion having a first holder and a second holder respectively extending from an upper edge and a lower edge of the mounting portion, the first holder having a first through hole defined therein and the second holder having a second through hole defined therein, wherein the first through hole and the second through hole co-axially correspond to each other so as to allow the bottle to extend through the first holder and the second holder, wherein a pair of through holes are defined in the mounting portion and each of the pair of through holes communicates with a corresponding one of the elongated groove; and a pair of fasteners screwed onto the bracket to selectively position the bracket on the main frame, each of the pair of fasteners has a bolt and a nut, the bolt having a head and a threaded stub extending from the head, wherein the head is received in a corresponding one of the two parallel elongated recesses and selectively securely abutting a bottom of the corresponding parallel elongated recess, each of the parallel elongated recesses having a depth greater than a thickness of the head, the nut being screwed onto the threaded stub after the threaded stub sequentially extends through the corresponding elongated groove and the corresponding through hole so as to fasten the bracket, wherein the mounting portion of the bracket is securely clamped between the nuts and the heads of the bolts and abutting the two elongated raised portions such that the bracket is fastened on the assembling portion of the main frame, wherein the main frame has a tray detachably mounted onto the supporting portion thereof, the tray having a concave portion defined in a top side thereof such that a lower end of the bottle is received in the concave portion when the modular unit holds the bottle in place.

3. The modular bottle rack of claim 1, wherein the main frame further has a tray detachably mounted onto the supporting portion thereof, the tray having a concave portion defined in a top side thereof such that a lower end of the bottle is received in the concave portion when the modular unit holds the bottle in place.

4. The modular bottle rack of claim 2, wherein the supporting portion has two opposite sides each having multiple bores defined therein and extending therethrough, and wherein the tray includes multiple snappers formed on a bottom face thereof and each snapper is selectively snapped into a corresponding one of the multiple bores for positioning the tray on the supporting portion.

5. The modular bottle rack as claimed in claim 3, wherein the supporting portion includes two opposite sides each having multiple bores defined therein and extending therethrough, and wherein the tray includes multiple snappers formed on a bottom face and each snapper is selectively snapped into a corresponding one of the multiple bores for positioning the tray on the supporting portion.

6. The modular bottle rack of claim 4, wherein the supporting portion has a concave portion defined in a top face thereof and the tray has a convex portion formed on a bottom face thereof, the convex portion being received in the concave portion in the supporting portion when the tray is mounted onto the supporting portion.

7. The modular bottle rack of claim 5, wherein the supporting portion has a concave portion defined in a top face thereof and the tray has a convex portion formed on a bottom face thereof, the convex portion being received in the concave portion in the supporting portion when the tray is mounted onto the supporting portion.

* * * * *